Jan. 10, 1956 P. J. H. JANSSEN 2,730,622
OSCILLATOR SYNCHRONIZATION
Filed Aug. 7, 1952
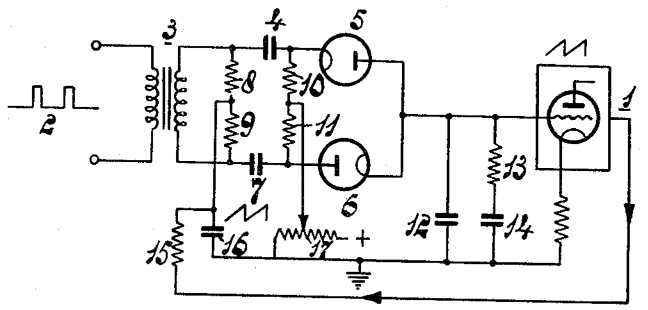
INVENTOR
PETER JOHANNES HUBERTUS JANSSEN
BY Fred M Vogel
AGENT United States Patent Office 2,730,622 Patented Jan. 10, 1956

2,730,622

OSCILLATOR SYNCHRONIZATION

Peter Johannes Hubertus Janssen, Eindhoven, Netherlands, assignor to Hartford National Bank and Trust Company, Hartford, Conn., as trustee Application August 7, 1952, Serial No. 303,041

Claims priority, application Netherlands September 10, 1951

1 Claim. (Cl. 250—36)

This invention relates to circuits for synchronizing an oscillator to a control oscillation, for example, for synchronizing a sawtooth generator in a television receiver by the aid of synchronizing pulses, the control oscillation and an oscillation derived from an output circuit of the oscillator being supplied to a phase discriminator and the output voltage of the discriminator controlling the oscillator by way of smoothing means, which circuit comprises means for varying the phase between the control oscillation and the oscillation produced by the oscillator.

As is well-known, in television receivers the line sawtooth generator is frequently controlled by way of a phase discriminator circuit by either the line synchronizing pulses or an oscillation derived therefrom.

It is also common practice to provide the receiver with a control knob which provides for varying the frequency of the line sawtooth oscillator.

When this knob is turned, for example, the direct voltage at one electrode of the oscillator or the value of a frequency-determining impedance or resistor is varied.

If the oscillator is synchronized and the control knob is turned, the image reproduced on the screen of the picture tube of the receiver will move in the line direction so long as synchronism is retained and hence the holding range of the circuit is not exceeded.

However, it has been found that this movement takes place suddenly, since the image at first rapidly moves too far and then returns more slowly to the new final position, which movement is unpleasant.

Furthermore, the synchronism is very liable to be disturbed at the boundaries of the holding range of the circuit.

The above mentioned phenomena are based upon the fact that, so long as the line sawtooth oscillator is synchronized, the frequency of the oscillator does not vary despite the fact that the free-running frequency is varied.

The influence of turning the control knob is neutralized by a variation in the output voltage of the phase discriminator, but this variation cannot take place sufficiently rapidly due to the great time-constant of the output circuit of the phase discriminator, which time-constant is chosen to be comparatively great with a view to avoiding disturbance.

Consequently, some time elapses before the correct phase between the synchronization signal and the local oscillations is adjusted.

The object of the present invention is to ensure substantially instantaneous adjustment of the correct phase whereby the movement on the image screen does not take place suddenly and synchronism is better retained. According to the present invention the circuit has the characteristic that an adjustable direct voltage is set up in series with the output voltage of the discriminator in such manner that the sum of the output voltage of the discriminator and the adjustable direct voltage is supplied to the smoothing means.

In order that the invention may be readily carried into effect, it will now be described in greater detail with reference to the accompanying drawing showing by way of example, one embodiment thereof.

In the circuit shown, a line sawtooth oscillator 1 which is shown only diagrammatically, is synchronized to line synchronization pulses 2.

For this purpose said pulses are supplied to a phase discriminator constituted by an input transformer 3, the secondary winding of which is connected to the series combination of a condenser 4, a rectifier 5, a rectifier 6 and a condenser 7, and to the series combination of two equal resistors 8 and 9.

The series combination of two equal resistors 10 and 11 is provided between the cathode of diode 5 and the anode of diode 6.

The junction between the anode of diode 5 and the cathode of diode 6 is connected by way of a network comprising the parallel combination of a condenser 12 and a circuit comprising the series combination of a resistor 13 and a condenser 14, to the control grid of a tube of the line sawtooth oscillator 1, the cathode of the tube concerned being connected to earth, for example, by way of a resistor.

The line sawtooth oscillator or a further device connected in series therewith has derived from it a voltage which is supplied to the junction of the resistors 8 and 9.

In the circuit under consideration it is assumed that the output of the oscillator 1 has derived from it a pulsatory voltage of the line sawtooth frequency which is converted with the use of a resistor 15 and a condenser 16 into a sawtooth voltage set up across condenser 16.

The drawing shows that the sawtooth voltage is supplied to the diodes 5 and 6 and the pulsatory synchronization voltage 2 is supplied thereto in anti-phase to the saw-tooth voltage.

The operation of such a phase discriminator is known, so that it suffices to mention that across condenser 12 a direct voltage occurs which is dependent upon the relative phase of the synchronization pulses 2 and the sawtooth voltage derived from the oscillator 1.

Said direct voltage varies upon variation of the relative phase of the oscillations, counteracting this variation in phase.

It is furthermore important to mention that resistor 13 and condenser 14 are provided inter alia for the purpose of avoiding undesired phenomena resulting from the feedback coupling between the output and input circuits of the oscillator 1.

The network constituted by the condensers 12 and 14 and the resistor 13 has a comparatively great time-constant.

In circuits previously known the time-constant of this network is responsible for the sudden variation in the relative phase which occurred upon operating the frequency control member of the oscillator.

In the circuit in accordance with the invention no use is made of a control member acting directly upon the frequency of the oscillator, but the junction of the resistors 10 and 11 is connected, as shown, to an adjustable tapping on a resistor 17, connected to a voltage source.

When the tapping point on resistor 17 is displaced, the direct voltage at the cathode of diode 5 and that at the anode of diode 6 is varied, so that the holding range of the circuit is shifted, resulting in a phase displacement between the synchronization signal and the oscillations produced by the oscillator 1, which phase displacement takes place instantaneously.

However, the output voltage of the discriminator circuit set up across the series-combination of resistor 13 and condenser 14 remains unvaried.

In the absence of the synchronization pulses 2, displacement of the tap on resistor 17 results in a variation in the frequency of the oscillator.

What I claim is:

In a television receiver, a circuit-arrangement for synchronizing the output of a sawtooth generator with synchronizing pulses comprising a transformer having a primary winding and a secondary winding, means for applying synchronizing pulses to said primary winding, first and second resistors connected serially across said secondary winding, first and second diodes each having a cathode and an anode, the anode of said first diode being connected to the cathode of said second diode, a first capacitor connected between one end of said secondary winding and the cathode of said first diode, a second capacitor connected between the other end of said secondary winding and the anode of said second diode, third and fourth resistors connected serially between the cathode of said first diode and the anode of said second diode, a third capacitor connected between the anode of said first diode and ground, a fifth resistor, a fourth capacitor connected in series with said fifth resistor across said third capacitor, the anode of said first diode being coupled to the input of said generator, a sixth resistor, the output of said generator being connected through said sixth resistor to the junction point between said first and second resistors, a fifth capacitor connected between said junction point and ground, and means for connecting the junction point between said third and fourth resistors to an adjustable source of potential for varying the phase between said synchronizing pulses and the output oscillations of said sawtooth generator.

References Cited in the file of this patent

UNITED STATES PATENTS

| | | |
|---|---|---|
| 2,446,188 | Miller | Aug. 3, 1948 |
| 2,463,685 | Fredendall | Mar. 8, 1949 |
| 2,541,259 | Maggio | Feb. 13, 1951 |